United States Patent [19]

Haim et al.

[11] Patent Number: 4,634,225

[45] Date of Patent: Jan. 6, 1987

[54] TRANSFLECTIVE LIQUID CRYSTAL DISPLAY WITH INTEGRAL HEATING UNIT AND TEMPERATURE SENSOR

[75] Inventors: Elias S. Haim, Windham, N.H.; John E. Suminsby, Wenham, Mass.

[73] Assignee: General Electric Co., Schenectady, N.Y.

[21] Appl. No.: 686,065

[22] Filed: Dec. 24, 1984

[51] Int. Cl.⁴ .............................................. G02F 1/13
[52] U.S. Cl. ..................... 350/331 T; 350/338; 350/349
[58] Field of Search .............. 350/331 T, 588, 346, 350/349, 338

[56] References Cited

U.S. PATENT DOCUMENTS

| | | | |
|---|---|---|---|
| 3,833,287 | 9/1974 | Taylor et al. | 350/349 |
| 4,009,934 | 3/1977 | Goodwin | 350/346 |
| 4,029,393 | 6/1977 | Dungan et al. | 350/331 T |
| 4,119,842 | 10/1978 | Hayden et al. | 350/331 T |
| 4,487,481 | 12/1984 | Suzawa | 350/331 T |

*Primary Examiner*—John K. Corbin
*Assistant Examiner*—David Lewis
*Attorney, Agent, or Firm*—I. D. Blumenfeld

[57] ABSTRACT

A heated transflective liquid crystal display device has the heating element positioned behind the transflector to keep the heater out of the reflective light path. This construction significantly improves brightness of the display in the reflective mode.

The heating element is positioned between the cell transflector and a temperature sensing thermistor. The thermal gradient of the path between the heating element and the thermistor matches that of the path between the heating element and the liquid crystal cell. As a result, the trip point of the heating element can be set much closer to the minimum cell operating temperature than hitherto possible thereby reducing the power consumption of the display.

This invention relates to liquid crystal display devices, and more particularly to liquid crystal displays incorporating a heating unit.

While the instant invention will be described in the context of a cell of the guest-host variety, the invention is by no means limited thereto. The invention is equally applicable and useful in a liquid crystal display utilizing a liquid crystal solution of the twisted nematic type.

10 Claims, 1 Drawing Figure

TRANSFLECTIVE LIQUID CRYSTAL DISPLAY WITH INTEGRAL HEATING UNIT AND TEMPERATURE SENSOR

BACKGROUND OF THE INVENTION

It is well known to utilize liquid crystal displays which operate either in a reflective or in a transmissive mode. In the former case, incident light entering the front of the display passes through the liquid crystal solution to a reflective element positioned behind the cell. The light is reflected back through the display to the viewer. In transflective devices, the display may be operated in both the reflective and the transmissive mode. To this end, a light source is positioned behind the reflective element. In the transmissive mode the light source is energized to transmit light from the back of the cell to the front.

In both reflective and transflective liquid crystal devices it may be desirable to incorporate a resistive heating element in those applications where the display is exposed to cold temperature. The resistive heating element and a temperature sensing element such as a thermistor, when positioned in the vicinity of the display, form a combination to energize the heating element whenever the temperature falls below a predetermined trip point. However, when the resistive heating element is incorporated directly onto the liquid crystal cell, as for example by depositing a resistive coating on the rear surface of the LCD back glass, a problem is encountered when the cell is illuminated in the reflective mode because the ambient light from the front of the cell must pass through the resistive coating twice resulting in both a significant reduction in brightness and in a potential color change. This is due to the fact that typical resistive coatings both atttenuate the transmitted light as well as cause a small color shift.

Accordingly, it is highly desirable to provide a heated liquid crystal display in which the heating element is positioned so as not to have any deleterious effects on brightness and color when the cell is operated in the reflective mode. Furthermore, in many applications, it is highly desirable to utilize a design configuration which will minimize the amount of power necessary to heat the liquid crystal display to its minimum operating temperature.

BRIEF SUMMARY OF THE INVENTION

In accordance with the invention, a liquid crystal display assembly, preferably of the guest-host type, has a transflective element positioned behind the cell. A heating element consisting of a glass substrate and a resistive layer is positioned between the transflector and the rear lighting source. The heating element is energized to heat the liquid crystal cell whenever the temperature of the cell drops below a predetermined temperature trip point which is higher than the minimum cell operating temperature. A temperature sensing thermistor element is positioned adjacent to the heater substrate so that the thermal gradient between the heating element and the temperature sensing element matches the thermal gradient between the heating element and the liquid crystal material. By matching the thermal gradients the temperature trip point can be set much closer to the cell minimum operating temperature significantly reducing power drain on the system.

Accordingly, it is an objective of the present invention to provide a novel liquid crystal display incorporating a heating element which does not affect the reflective light path, while, at the same time, minimizing system power requirements.

The novel features which are believed to be characteristic of this invention are set forth in the appended claims. The invention itself, however, both as to its organization and mode of operation, together with further objectives and advantages thereof may best be understood by reference to the following description taken in connection with the accompanying drawing:

DETAILED DESCRIPTION OF THE INVENTION

Figure 1:
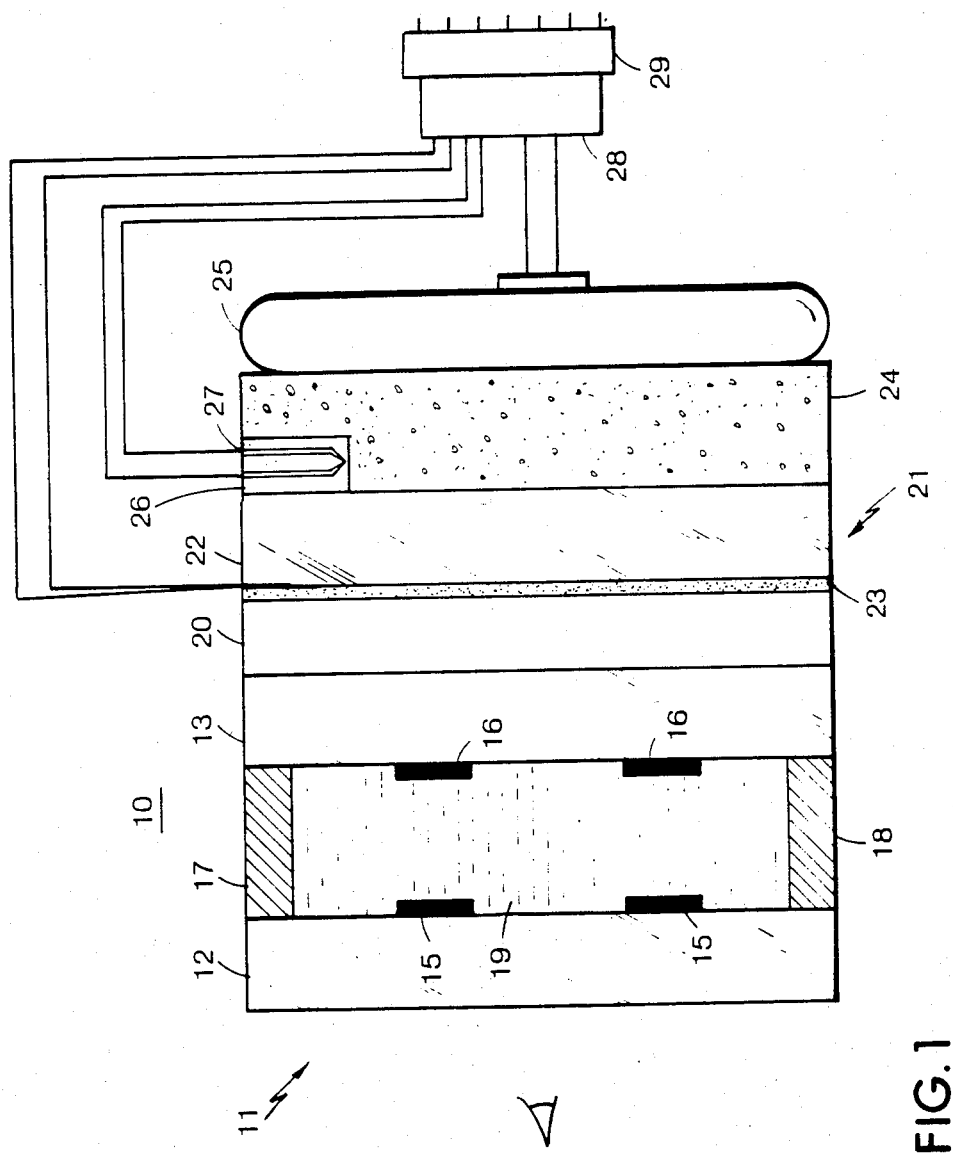
FIG. 1 is a sectional view of a liquid crystal display device incorporating the heater structure of the sole invention.

FIG. 1 shows a transflective liquid crystal display which includes a liquid crystal cell 11 having a front substrate 12 and a rear substrate 14 of a substantially transparent material, such as glass or the like. Deposited on the interior surfaces of the front and rear substrates are optically transmissive, conductive electrodes segments 15 and 16 which define the cell display elements. As is well known in the art, electrodes 15 and 16 may be fabricated of indium oxide, tin oxide, indium tin oxide (with the latter being preferred) and the like. The front and rear plates of the cell are sealed by means of the sealing plug elements 17 and 18 to form a chamber which contains liquid crystal solution 19. Liquid crystal solution 19 is preferably one in which a dichroic dye or combination of dyes is a guest in a liquid crystal host material of the cholesteric type. The solution also includes an optically active material whereby the host liquid crystal molecules assumes a helical orientation with the molecules substantially parallel and twisted with respect to the cell walls in the absence of an electric field.

Electrodes 15 and 16 are connected through suitable leads and a switching means, not shown, to a voltage source. When the switching means opens the liquid crystal material molecules assume their normal helical orientation. The long axes of the dichroic molecules are aligned helically and parallel to the substrate surface so that light passing through the cell is essentially absorbed by the dye molecules. When power is applied to the electrodes segments 15 and 16, an electric field is established and the liquid crystal molecules between those electrodes assume a homeotropic order with their long axes substantially perpendicular the plane of the front and rear electrode; i.e., the helix unwinds. The dye molecules also align themselves in a homeotropic order with their long axis perpendicular to the plane of the electrodes and in this orientation permit light to pass. Thus, light is transmitted in the energized sections presenting white or colored indicia or symbols against a dark background.

Positioned immediately behind the back substrate 13 of cell 11 is a transflector 20 which has a high degree of reflectance, typically 90 to 95% of the light impinging thereon, while at the same time having a high degree of transmittance of the light generated by the internal light source. Transflectors may be constructed in a variety of ways.

The preferred form is synthetic polypropylene fiber paper or the like may be utilized as a transflector. With one form of such a synthetic polypropylene fiber paper is available from the Munising Division of Kimberly-Clark Corporation under the trade designation Kimdura. Alternatively, the transflector may be a transparent glass substrate having a white barium sulfate coating (for example, of the type sold by Kodak under its designation 6080 white reflectance coating) which is deposited on the glass substrate as a slurry in water or alcohol solvent. The slurry is heat dried and then a white acrylic lacquer sealing coating is sprayed over the white barium sulfate layer.

Positioned behind the transflector 20 and thus out of the reflective light path is a heater element 21 comprising a transparent glass substrate 22 having a resistive heating layer 23 deposited on the front surface. Layer 23 may be metallic or may be a polymeric resistive material. Polymeric resistive materials are readily available from a number of vendors. Examples of such vendors are:

Deposition Technology Inc, 8963 Carrol Way, Dan Diego, Ca. 92121;

Minco Transfoil Heaters, 7300 Commerce Lane, Minneapolis, Minn. 55432;

Southwall Technologies, 1029 Corporation Way, Palo Alto, Ca. 94303 although the list is by no means exhaustive. Leads attached to the resistive layer permit current flow for heating purposes. The back of the heating element is positioned directly against and optionally cemented to a diffusing element 24 which abuts directly against the front of a light source 25 which preferably may be a planar, electroluminescent device as shown or which may be an alternate light source such as incandescent lamps. With the construction shown in FIG. 1, it can be seen that a heating element is in heat exchange relationship both with the rear of cell 11 and with diffuser 24 positioned between it and the lighting source. Diffuser 24 has one or more openings 26 which supports a temperature sensing element 27 which may be a thermocouple, thermistor, RTD, or any other element which produces an electrical signal as a function of temperature.

In accordance with the invention, the size, thickness and composition of substrate 22 is such that its thermal gradient matches the thermal gradient between the resistive layer 23 and the liquid crystal solution 19. In this fashion, the temperature sensing element 27 is essentially at the same temperature as the liquid crystal solution; i.e., the temperature conditions at the sensor match the temperature conditions inside the cell. Consequently, the temperature trip point for actuating the heater can be set quite close to the minimum cell operating temperature. Otherwise it is unnecessary to provide a safety margin by setting the temperature trip point at a temperature which is much higher than the minimum cell operating temperature. This, of course, results in a higher power requirement for the system above the actual minimum operating temperature.

An additional feature of the invention is that the output leads from the temperature sensing element 27, and the light source 25 are coupled through cable 28 to a common output connector 29. This makes the heater element totally independent from the liquid crystal display cell both electrically and mechanically by removing all heater wiring from the liquid crystal display cell. This very desirable result is achieved by attaching the heater to the diffuser so that the heater wiring and the temperature sensor wiring can be routed out to the same interconnection as the diffuser lamps.

It will be realized that a very effective heating arrangement for a liquid crystal display system has been provided in which the heater element does not deleteriously affect the cell during the reflective mode operation and which also establishes thermal paths so that the temperature sensing element utilized to actuate the heater accurately reflects and mirrors the temperature conditions at the cell. While the instant invention has been described in connection with the preferred embodiments thereof, the invention is by no means limited thereto since other modifications of the instrumentalities employed may be made and forward in the scope of the invention.

What we claim is new and desire to secure by Letters Patent of the United States is:

1. In a heated liquid crystal display, the combination comprising:
   (a) a liquid crystal cell containing a liquid crystal solution,
   (b) reflector means positioned behind said cell to reflect light entering the front of the cell back through the cell,
   (c) heating means located outside of the reflective light path including a heating element and a support element in heat exchanging relationship with said cell for maintaining the temperature of the solution above the minimal operating temperature of the solution,
   (d) temperature responsive sensing means positioned adjacent to said heating element and in heat exchange relationship therewith to to generate an electrical signal as a function of temperature, said temperature responsive sensing means is a separate element from said liquid crystal solution and is a separate element from said heating means,
   (e) said heating and support elements being constructed so that the temperature gradients between the heater element and the cell solution and the heater element and said sensing means respectively are substantially equal whereby the temperature at the sensing means essentially tracks the cell temperature.

2. The heated liquid crystal display according to claim 1 wherein said heating means is positioned behind and adjacent to said reflector means.

3. The heated liquid crystal display according to claim 2 wherein the heater element on said substrate contacts said reflector and said temperature sensing means is located adjacent said support element on the side away from said heater element to establish a thermal path through said support means to said sensing means.

4. The liquid crystal according to claim 3 wherein said heater element is located on one side of said support element and said temperature sensing means is on the other side of said support element.

5. The heated liquid crystal display according to claim 4 including a transflective element behind said cell and a light source positioned behind said heating means for selectively operating said display in the transmissive mode.

6. The heated liquid crystal display according to claim 5 including a light diffusive element between said light source and the rear of said heating means.

7. The heated liquid crystal display according to claim 6 wherein said temperature sensing means is supported on said diffusing means.

8. The heated liquid crystal display according to claim 7 wherein the rear of said heating means is attached to said light diffusing means.

9. The heated liquid crystal display according to claim 1 wherein said liquid crystal solution is a guest-host solution including an optically active material.

10. The heated liquid crystal display according to claim 8 wherein the said liquid crystal solution includes at least one dichroic dye dissolved in a liquid crystal host and including an optically active chiral material.

* * * * *